(12) United States Patent
Satomi

(10) Patent No.: US 7,735,133 B2
(45) Date of Patent: Jun. 8, 2010

(54) AUTHENTICATION SYSTEM, CONTROL METHOD AND PROGRAM THEREOF, AND STORAGE MEDIUM

(75) Inventor: Hiroshi Satomi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 944 days.

(21) Appl. No.: 11/043,206

(22) Filed: Jan. 27, 2005

(65) Prior Publication Data

US 2005/0166265 A1 Jul. 28, 2005

(30) Foreign Application Priority Data

Jan. 28, 2004 (JP) .............................. 2004-020378

(51) Int. Cl.
G06F 7/04 (2006.01)
(52) U.S. Cl. .............................. 726/21; 726/2; 713/168
(58) Field of Classification Search ................ 726/2–3; 713/150, 168; 705/14
See application file for complete search history.

(56) References Cited

U.S. PATENT DOCUMENTS

| | | | | |
|---|---|---|---|---|
| 5,495,235 A | * | 2/1996 | Durinovic-Johri et al. | 340/5.27 |
| 5,550,968 A | * | 8/1996 | Miller et al. | 715/741 |
| 5,559,505 A | * | 9/1996 | McNair | 340/5.28 |
| 5,855,007 A | * | 12/1998 | Jovicic et al. | 705/14 |
| 5,884,277 A | * | 3/1999 | Khosla | 705/14 |
| 5,963,926 A | | 10/1999 | Kumomura | 705/41 |
| 6,467,686 B1 | * | 10/2002 | Guthrie et al. | 235/383 |
| 6,587,867 B1 | * | 7/2003 | Miller et al. | 709/200 |
| 6,769,068 B1 | * | 7/2004 | Brozowski et al. | 726/5 |
| 7,013,286 B1 | * | 3/2006 | Aggarwal et al. | 705/14 |
| 2002/0026510 A1 | | 2/2002 | Satomi et al. | 709/225 |
| 2002/0038337 A1 | | 3/2002 | Satomi et al. | 709/203 |
| 2002/0073329 A1 | * | 6/2002 | Brombal | 713/200 |

(Continued)

FOREIGN PATENT DOCUMENTS

EP 0923039 A1 * 6/1999

(Continued)

OTHER PUBLICATIONS

U.S. Appl. No. 09/547,401, filed Apr. 11, 2000.

(Continued)

Primary Examiner—Kimyen Vu
Assistant Examiner—Darren Schwartz
(74) Attorney, Agent, or Firm—Fitzpatrick, Cella, Harper & Scinto

(57) ABSTRACT

An authenticated user is provided with page information relating to a service to be provided, such as a service for ordering products. In the invention, the authenticated user is provided with page information in either a first or second form, wherein in the first form the page information includes an entry field for coupon information and in the second form the page information does not include the entry field for the coupon information. When coupon information input in the entry field is received, a determination is made whether or not the coupon information is valid. The number of times that the coupon information is determined to be invalid is counted and stored in association with the authenticated user. When the counted number does not exceed a predetermined value, the user is provided with the page information in the first form, while the page information is provided in the second form when the counted number exceeds the predetermined value.

4 Claims, 14 Drawing Sheets

U.S. PATENT DOCUMENTS

| | | | |
|---|---|---|---|
| 2002/0087892 A1* | 7/2002 | Imazu | 713/202 |
| 2002/0161640 A1* | 10/2002 | Wolfe | 705/14 |
| 2002/0169662 A1* | 11/2002 | Claiborne | 705/14 |
| 2002/0174009 A1* | 11/2002 | Myers et al. | 705/14 |
| 2002/0188565 A1* | 12/2002 | Nakamura et al. | 705/42 |
| 2002/0194069 A1* | 12/2002 | Thakur et al. | 705/14 |
| 2003/0063304 A1 | 4/2003 | Satomi et al. | 358/1.11 |
| 2003/0065531 A1 | 4/2003 | Satomi et al. | 705/1 |
| 2003/0065585 A1 | 4/2003 | Satomi et al. | 705/26 |
| 2003/0065647 A1 | 4/2003 | Satomi et al. | 707/1 |
| 2003/0065807 A1 | 4/2003 | Satomi et al. | 709/231 |
| 2003/0166265 A1 | 9/2003 | Pugia et al. | 435/288.3 |
| 2004/0030598 A1* | 2/2004 | Boal | 705/14 |
| 2004/0098303 A1* | 5/2004 | Truong et al. | 705/14 |

FOREIGN PATENT DOCUMENTS

WO     WO 02/037729 A2 * 10/2002

OTHER PUBLICATIONS

U.S. Appl. No. 09/548,973, filed Apr. 13, 2000.
U.S. Appl. No. 09/548,364, filed Apr. 12, 2000.
U.S. Appl. No. 09/548,404, filed Apr. 12, 2000.

* cited by examiner

FIG. 3

| ITEM | TYPE | |
|---|---|---|
| SERVICE ID | INTEGER TYPE | 301 |
| SITE ID | INTEGER TYPE | 302 |
| ISSUANCE COUNT | INTEGER TYPE | 303 |
| COUPON VALID DATE | INTEGER TYPE | 304 |
| IDENTICAL COUPON USE LIMIT COUNT | INTEGER TYPE | 305 |
| DISCOUNT RATE | INTEGER TYPE | 306 |
| UNIT DISCOUNT AMOUNT | INTEGER TYPE | 307 |
| DISCOUNT UPPER LIMIT AMOUNT | INTEGER TYPE | 308 |

FIG. 8

```
           801              802                              800
            |                |                                |
      ┌──────────┐    ┌──────────┐
      │ ESTIMATE │    │  CANCEL  │
      └──────────┘    └──────────┘
      ─────────────────────────────────────────────

NAME
      LAST NAME : [ TIYANO ]     FIRST NAME : [ TARO ]

ADDRESS
      〒 : [ 211 ] - [ 8501 ]
      PREFECTURE :      [ TOKYO          ▼ ]
      CITY, STREET ADDRESS : [ SIMOMARUKO 3-30-2 OHTA-KU ]
      APARTMENT/MANSION, ROOM NUMBER : [                    ]

TELEPHONE NUMBER
      [ 03 ] ( [ 000 ] ) [ 0000 ]
```

FIG. 9

SERVICE SITE: ESTIMATE — 900

ORDER 901  CANCEL 902

| ARTICLE NAME | UNIT PRICE | QUANTITY | SUB TOTAL |
|---|---|---|---|
| LBP | ￥10,000 | 1 | ￥10,000 |
| COUPON DISCOUNT | 10% | | ￥1,000 |
| SHIPPING CHARGE | ￥500 | | ￥500 |
| CONSUMPTION TAX | | | ￥450 |
| TOTAL | | | ￥9,950 |

AUTHENTICATION SYSTEM, CONTROL METHOD AND PROGRAM THEREOF, AND STORAGE MEDIUM

FIELD OF THE INVENTION

The present invention relates to a technique for suppressing illicit use of an authentication system.

BACKGROUND OF THE INVENTION

The rapid spread of the Internet has triggered the emergence of services that market commercial products via the Internet. Such a service is called an on-line sales service. In some services, when a service user inputs an authentication code such as a coupon number or the like, given in advance, a Web server provides the perk such as a discount of a given amount to the user.

Upon providing services using on-line coupons, a prevention measure against illicit use of a coupon number by a malicious user must be taken. A conventional server gives the perk upon reception of a correct number input to a remote computer. Hence, a malicious user can receive the perk by inputting a large number of different coupon numbers at random. As a result, the service provider gives the benefits to unintended users, and suffers involuntary losses.

In order to prevent such illicit use, a complicated number to which a dummy number is appended or which is encrypted is assigned as a coupon number. As a result, a malicious user is forced to input a large number of numbers until he or she can acquire a correct coupon number.

However, the increase in computer's processing power upon speeding up of computers in recent years has allowed some malicious users to make use of computer programs to easily issue and input a large number of numbers and to illicitly acquire a coupon number.

As a measure against such illicit methods, a complicated coupon number may be used. However, as the coupon number is complicated, the number of requests issued until a malicious user illicitly acquires a coupon number increases. As a result, the load on the server that provides services becomes heavier, and authentic users who normally use the services may suffer disadvantages such as deterioration of performance and the like.

Also, when the coupon number is complicated, input errors by authentic users increase.

It is not easy for the administrator who provides services to determine whether an input error of a coupon number is made due to illicit use of the number by a malicious user or a coupon number is merely erroneously input by a user who is entitled to use the coupon number.

In order to prevent illicit use, like a cash withdrawal service using an ATM (automated teller machine), it is determined that an input by a malicious user is made if the number of wrong input for a corresponding ID exceeds a predetermined number, the service is suspended. However, when the coupon number is complicated and input errors of authentic users increase, the service use of many authentic users could be suspended, generating numerous inquiries to the administrator, and thus, resulting in huge management cost.

SUMMARY OF THE INVENTION

The present invention has been proposed to solve the conventional problems, and effectively suppress illicit accesses to an authentication system without increasing the burden on the administrator.

That is, the present invention is an authentication system for authenticating an authentication code input from a user terminal, the user terminal comprising display means for displaying either of a first form having an authentication code input field used to input the authentication code, and a second form without any authentication code input field, the authentication system comprising creation means for creating first display data required to display the first form on the basis of second display data required to display the second form, and script information required to display the authentication code input field, first transmission means for transmitting the first display data to the user terminal, reception means for receiving the authentication code input to the authentication code input field from the user terminal, authentication means for authenticating if the authentication code received by the reception means is authentic, counting means for counting the number of unauthentic authentication codes determined by the authentication means, save means for saving the count counted by the counting means in a memory, count checking means for checking if the count saved by the save means in the memory reaches a predetermined value and second transmission means for transmitting one of the first display data and the second display data in accordance with a checking result of the count checking means.

Other features and advantages of the present invention will be apparent from the following description taken in conjunction with the accompanying drawings, in which similar reference characters designate the same or similar parts throughout the figures.

BRIEF DESCRIPTION OF THE DRAWINGS

FIG. 3 shows the content of a coupon type-dependent information management table managed by a coupon server according to the embodiment of the present invention;

FIG. 8 shows an example of a user information input window displayed on the user terminal according to the embodiment of the present invention;

FIG. 9 shows an example of an estimation window displayed on the user terminal according to the embodiment of the present invention;

DETAILED DESCRIPTION OF THE PREFERRED EMBODIMENTS

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

In this embodiment, on-line product sale is made. However, the present invention is not limited to such specific service, and can be applied to all kinds of services that give the perk to the users by inputting numbers, symbols, and the like.

<System Arrangement>

Figure 1:
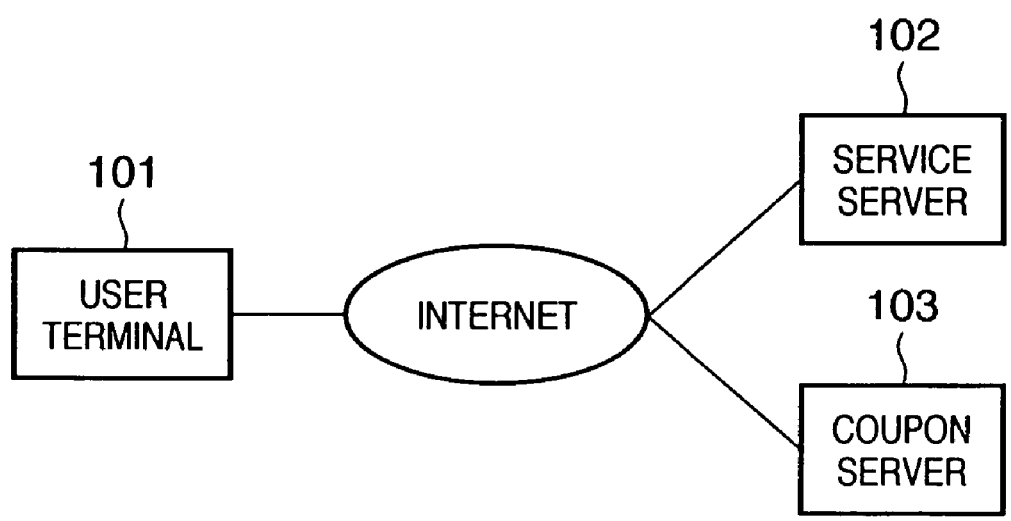
FIG. 1 is a diagram showing the arrangement of an on-line coupon system according to the embodiment of the present invention.

FIG. 1 shows the arrangement of an on-line coupon system according to the embodiment of the present invention.

Referring to FIG. 1, reference numeral 101 denotes a user terminal. A service user accesses from this terminal a service server 102 that provides a service via the Internet. The service server 102 performs processes such as user authentication, management of commercial products to be marketed, billing, and the like. Also, the service server 102 communicates with a coupon server 103 to provide a service perk to a user according to a result obtained from that server 103. The coupon server 103 issues a coupon number as an authentication code. Upon reception of an inquiry from the service server 102, the coupon server 103 checks if a coupon number is valid, and returns that result to the service server 102. Note that the user terminal 101, the service server 102, and the coupon server 103 communicate with each other using TCP/IP. In this embodiment, the service server 102 and the coupon server 103 are independent servers. However, the service server 102 may also have the function of the coupon server 103. The coupon server 103 issues a coupon number to the user terminal 101 via the service server 102 or directly.

Figure 2:
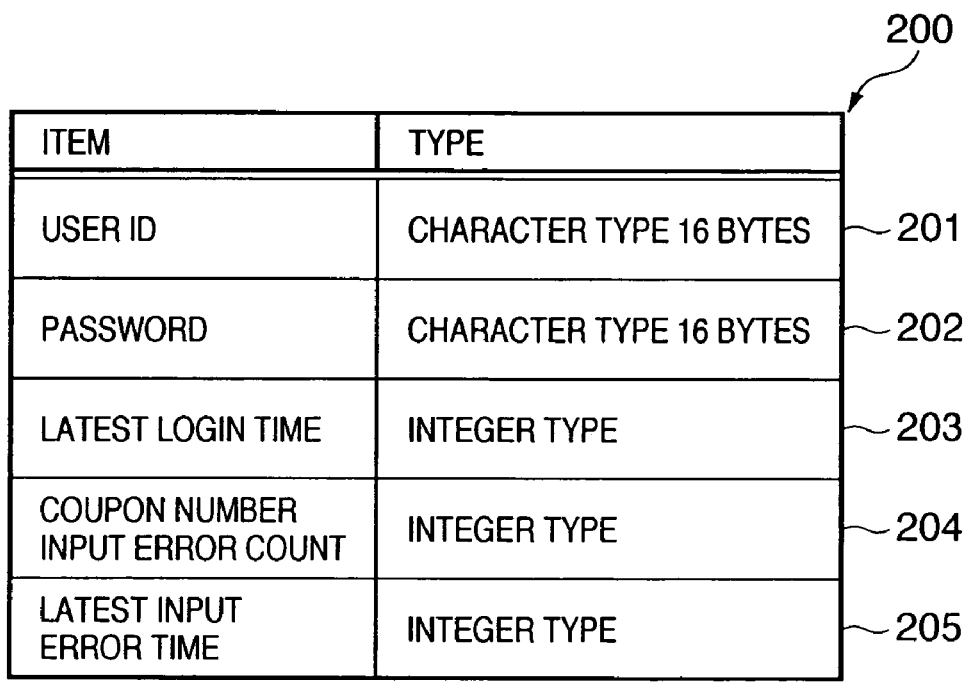
FIG. 2 shows the content of a user information table managed by a service server according to the embodiment of the present invention.

FIG. 2 shows the contents of a user information table managed by the service server 102 in the embodiment of the present invention.

The service server 102 stores in a user information table 200 a user ID 201, a password 202 used in user authentication, a latest login time 203, a coupon number input error count 204, and a latest coupon number input error time 205, as shown in FIG. 2.

FIG. 3 shows the contents of a coupon type-dependent information management table 300 managed by the coupon server 103 in the embodiment of the present invention.

The coupon server 103 stores as a coupon type-dependent information management table 300 a service ID 301, a service site ID 302 that provides that service, an issuance count 303 of a coupon number, a valid date 304 of a service for the service ID 301, a use limit count 305 of an identical coupon number, a discount rate 306, a unit discount amount 307, and an upper limit 308 of the discount amount, as shown in FIG. 3. In this embodiment, the discount rate is held as %, and when the value of the discount rate 307 is "0", a coupon that allows the user to receive a discount perk of an amount equal to the value stored in the unit discount amount 307 is issued.

Figure 4:
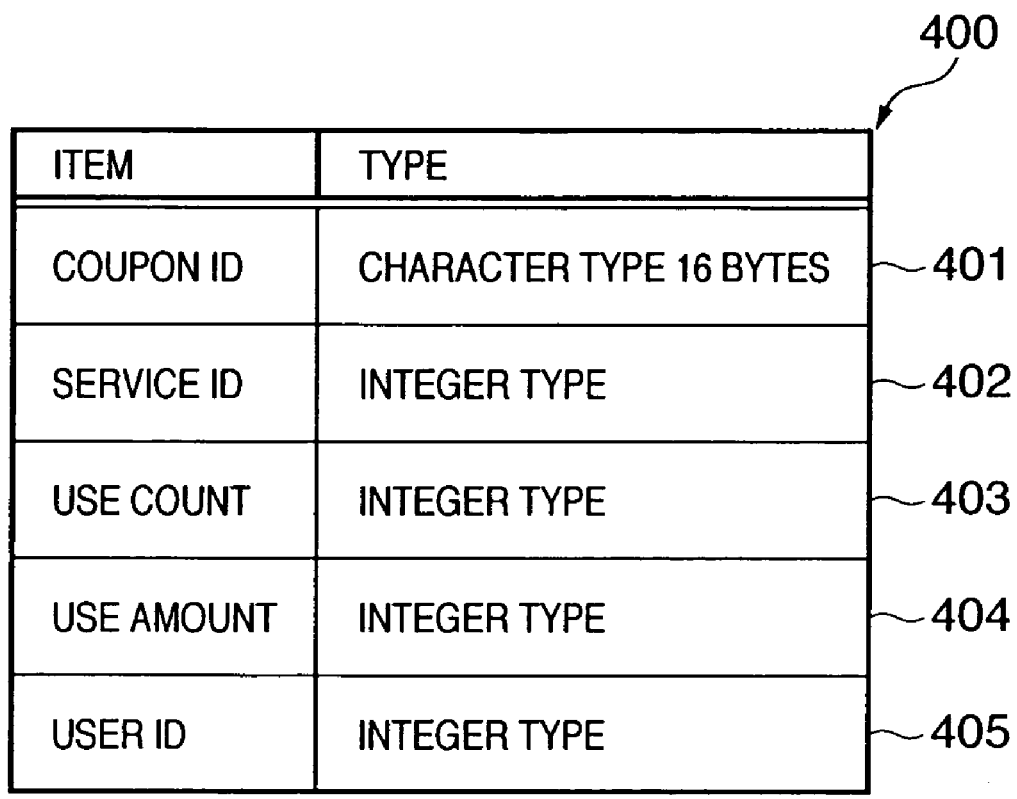
FIG. 4 shows the content of a coupon ID information management table managed by the coupon server according to the embodiment of the present invention.

FIG. 4 shows the content of a coupon ID information management table 400 managed by the coupon server 103 in the embodiment of the present invention.

The coupon server 103 stores in a coupon ID information management table 400 a coupon ID 401, a service ID 402, a coupon use count 403 for this ID, a previous coupon use amount 404 for this ID, and a user ID 405 corresponding to the coupon ID, as shown in FIG. 4. In this embodiment, if the user ID is −1, this coupon ID is not associated with any user since it is not issued or it is generally used for users.

<Coupon Service Flow>

Figure 5:
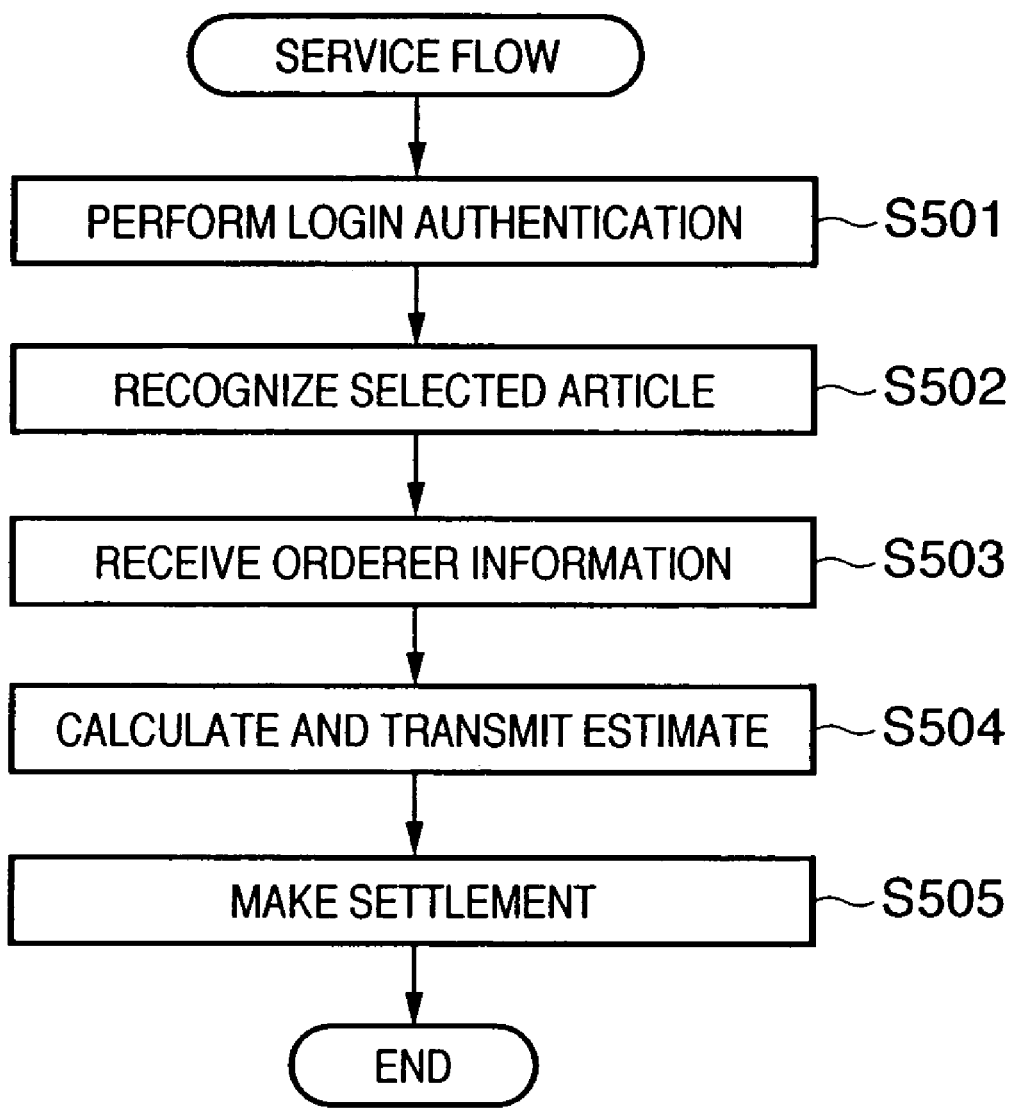
FIG. 5 is a flowchart showing an overview of the processing sequence for a service that utilizes the on-line coupon system according to the embodiment of the present invention.

FIG. 5 is a flowchart showing an overview of a coupon service providing process.

Figure 6:
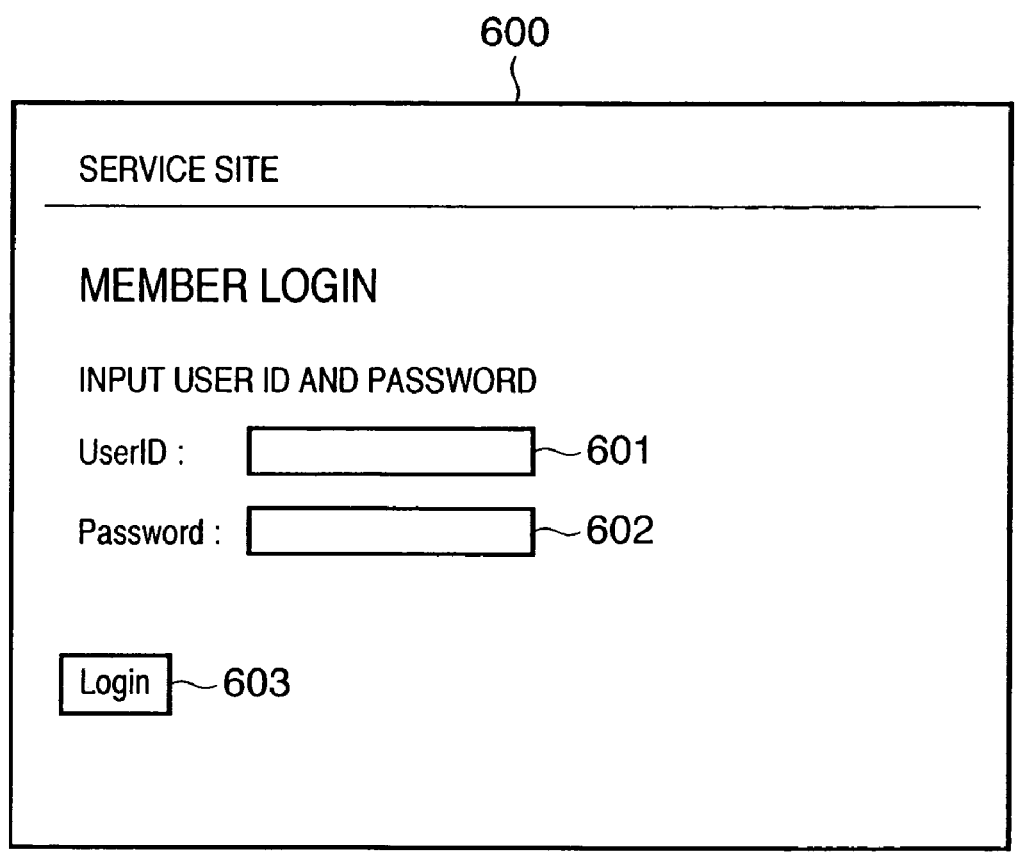
FIG. 6 shows a dialog which is sent from the service server to a user terminal and is displayed upon making authentication by the service server according to the embodiment of the present invention.

In step S501, the service server 102 performs login authentication for the user on the basis of the ID and password input at the user terminal 101. FIG. 6 shows a login dialog which is displayed on the user terminal 101 by sending login authentication dialog display data from the service server 102 to the user terminal 101. The user inputs a user ID in an input field 601 and a password in an input field 602, and clicks a "Login" button 603. The service server 102 checks with reference to the user information table 200 if a combination of the user ID and password received from the user terminal 101 is stored. As a result, if such combination of the user ID and password exists, login authentication of the user succeeds and is authorized by the service server 102.

Figure 7:
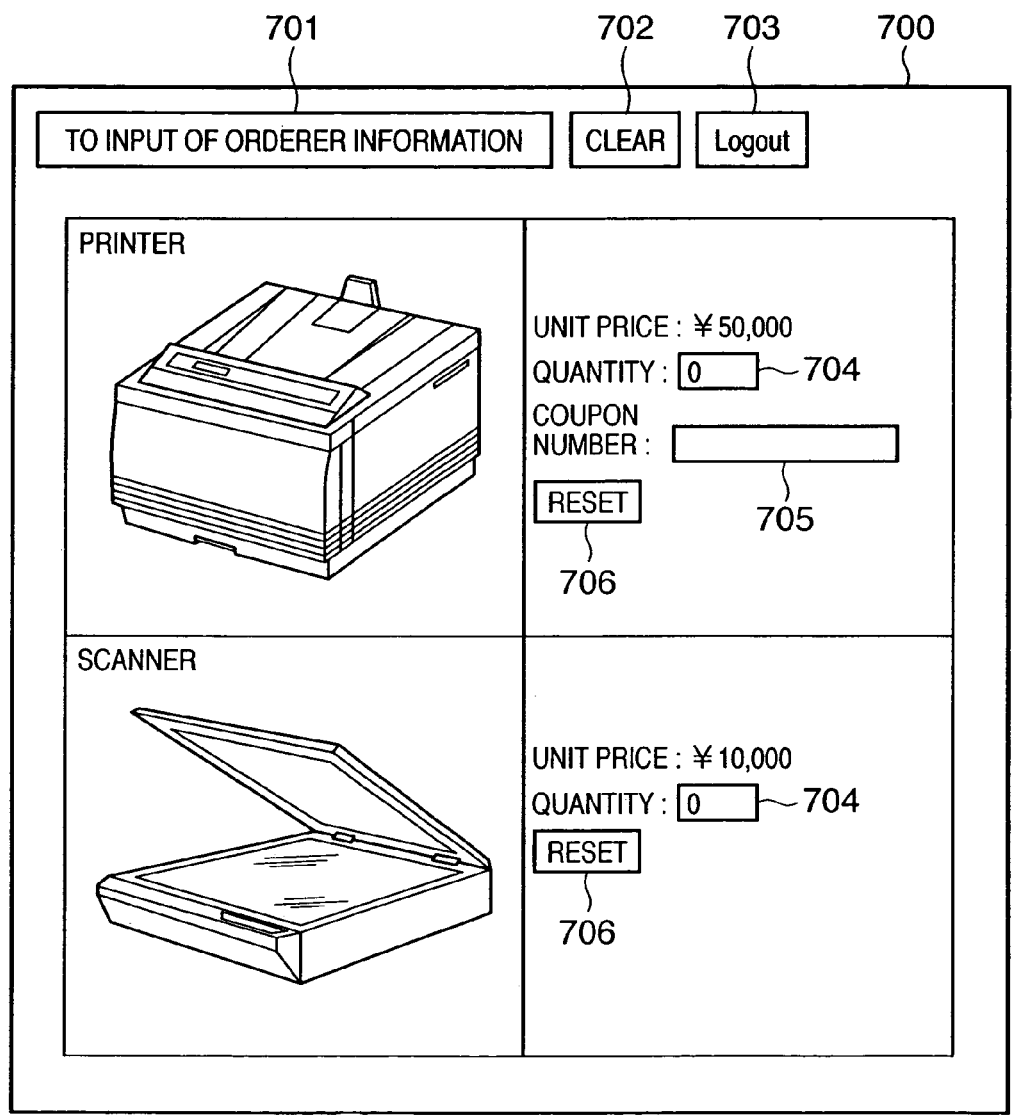
FIG. 7 shows an example of an order window displayed on the user terminal when login authentication has succeeded in the system according to the embodiment of the present invention.

FIG. 7 shows an order window 700 as an example of a first form which is displayed on the user terminal 101 when login authentication has succeeded. This window displays article names, unit prices of articles, and various buttons. The service user inputs the quantity of an article to be purchased in an input field 704. Also, a coupon number input field 705 is displayed depending if various conditions (to be described later) are satisfied.

Note that the service server 102 creates order window display data required to displays article names, unit prices of articles, various buttons, and quantity input fields and holds that data in a memory. When the service server 102 detects that login authentication of the user has succeeded, it sends the held the order window display data to the user terminal 101. When various conditions (to be described later) are satisfied and the coupon number input field 705 is to be displayed, the service server 102 appends information required to display the coupon number input field 705 to the held order window display data (second form display data having no coupon number input field) to create order window display data with a coupon number input field, and sends it to the user terminal 101.

Upon clicking a "to input the ordered information" 701 in FIG. 7, the service server 102 checks the input information received from the user terminal 101. For example, the server 102 checks if an integer equal to or larger than "0" is input to each quantity input field 704. If no problem is found, the server 102 sends the user registration data required to display a user information input window (FIG. 8) on the user terminal 101 to the user terminal 101. In this case, the server 102 recognizes (selects) the article or articles with the quantity input field 704 to which a value equal to or larger than "1" is input in step S502. If the input information received from the user terminal 101 includes an arbitrary number or character string input to the coupon number input field 705, the service server 102 begins to communicate with the coupon server 103. Note that authentication of the coupon number will be described later.

When the user fills all the required information on the user information input window 800 in FIG. 8 displayed on the user terminal 101 and then clicks the "estimate" button 801, the service server 102 receives the user information (delivery address information of articles) input at the user terminal 101 in step S503. The flow advances to step S504, and the service server 102 reads out the unit price data of each article corresponding to the user's choice recognized in step S502 from its database, multiplies the quantity received in step S502 and adds a shipping charge and consumption tax to calculate an estimated amount. The server 102 sends the estimate window display data embedded with a value calculated as the estimated amount to the user terminal 101, so that the calculated estimated amount is displayed on an estimate window 900 shown in FIG. 9. The estimate window 900 displays a perk (discount amount) according to the coupon number input, shipping charge, consumption tax, and the like in addition to the article name, the article price, and the ordered quantity, as shown in FIG. 9. When the service user clicks the "order" button 901 on the estimate window in FIG. 9, an order command is transmitted from the user terminal 101 to the service server 102, which receives this order command, and executes a settlement process and an order placement process in step S505, thus ending the order flow.

<Coupon Number Authentication Process>

Figure 10:
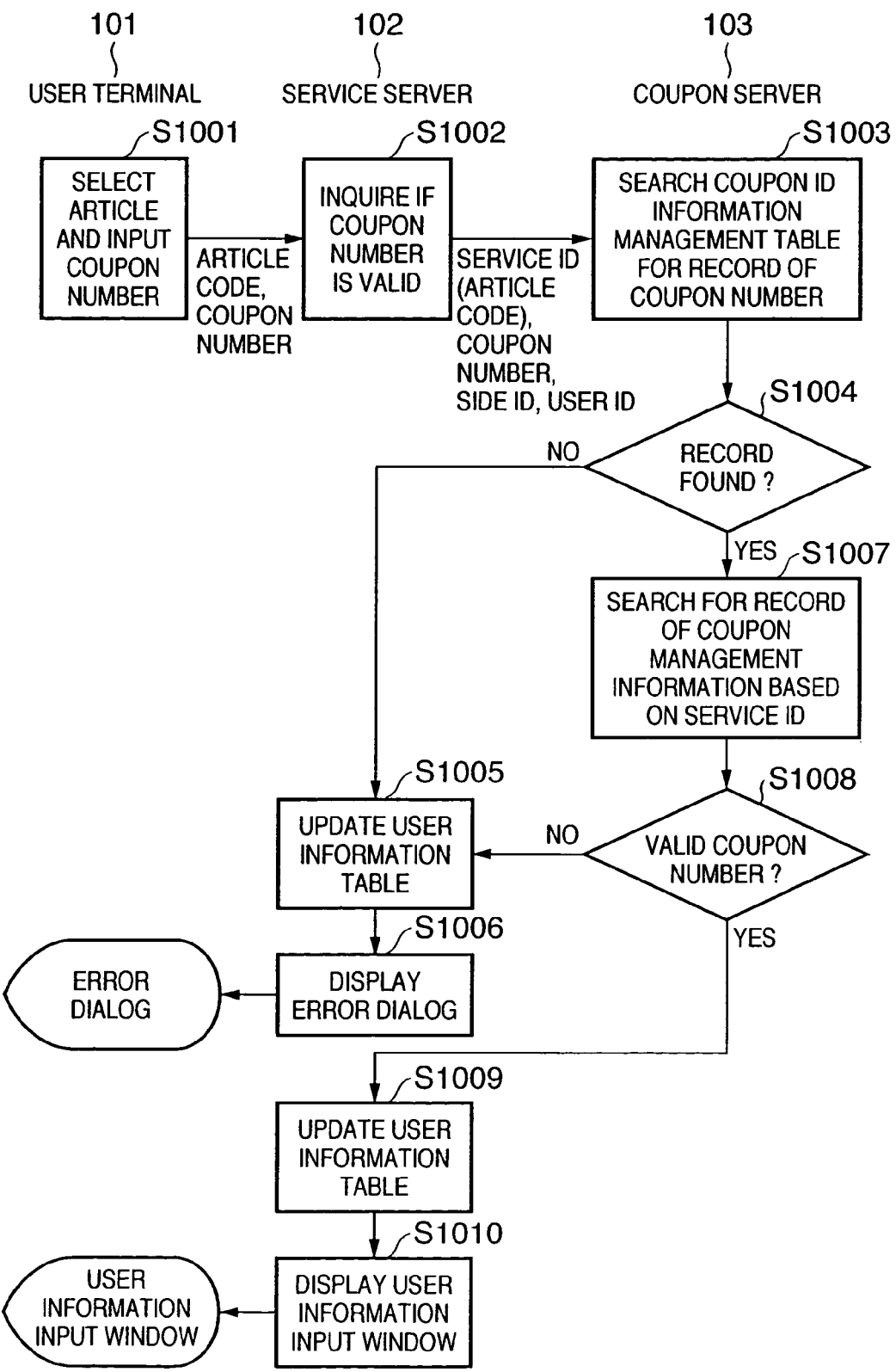
FIG. 10 is a flowchart showing a checking process of an input coupon number according to the embodiment of the present invention.

FIG. 10 is a flowchart showing a process for authenticating a coupon number input to the coupon number input field 705 on the order window 700 in FIG. 7.

In step S1001, the user inputs a coupon number to the coupon number input field 705 of an article to be purchased at the user terminal 101. The user terminal 101 sends the article ID of an article with the quantity input field 704 to which "1" is input, and the input coupon number to the service server 102.

In step S1002, the service server 102 passes the article ID and coupon number to the coupon server 103 to ask it to check if the coupon number sent from the user terminal 101 is correct.

In step S1003, the coupon server 103 searches the coupon ID information management table 400 for the article ID and coupon number sent from the service server 102. In this embodiment, the article ID is equal to the service ID. Alternatively, the service server 103 may manage a service ID corresponding to a plurality of article IDs, and may issue an inquiry using that ID.

The coupon server 103 checks in step S1004 if a corresponding record is found. If no record is found, the coupon server 103 returns an error code that advises so to the service server 102.

In step S1005, the service server 102 adds 1 to the coupon number input error count 204 in the user information table 200, and substitutes the current time in the latest error input time 205.

Figure 12:
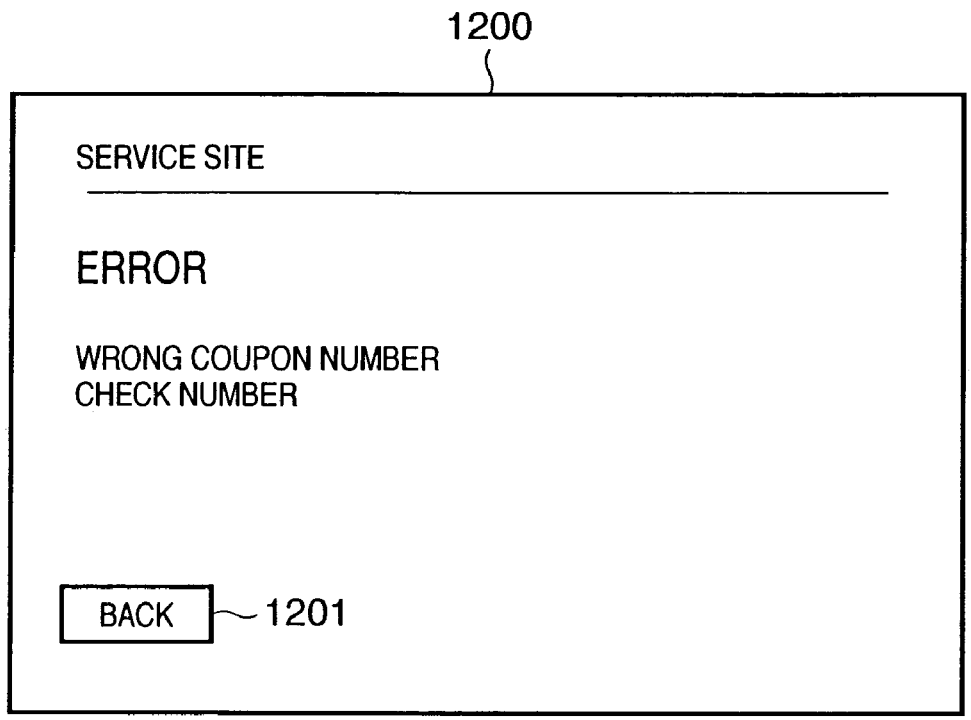
FIG. 12 shows an example of an error dialog displayed on the user terminal according to the embodiment of the present invention.

In step S1006, the service server 102 displays an error dialog. At this time, the service server 102 creates error dialog display data required to display an error dialog 1200 shown in FIG. 12 if the value stored in the coupon number input error count 204 of the user information table 200 falls within an allowable range. The service server 102 transmits the display data to the user terminal 101, which displays the error dialog. Upon reception of a click input of a "return" button 1201 on the error dialog 1200, the server 102 sends the order window display data with the coupon number input field of the corresponding article to the user terminal 101 to display the order window with the coupon number input field, thus prompting the user to re-input the coupon number.

Figure 13:
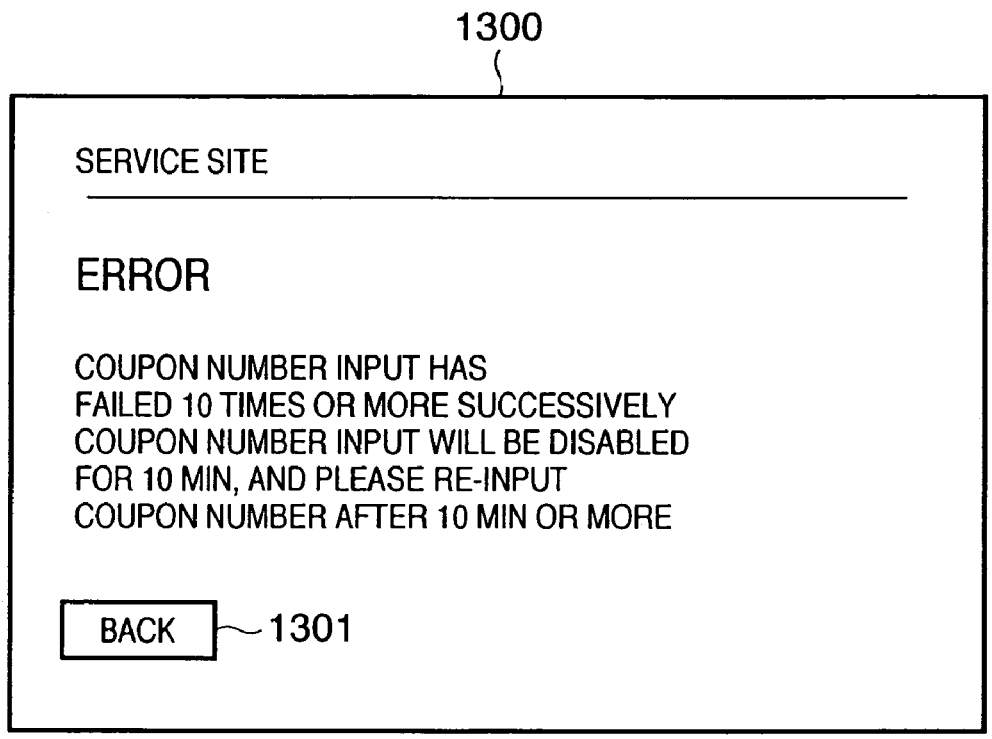
FIG. 13 shows an example of an error dialog displayed on the user terminal according to the embodiment of the present invention.

If the value stored in the coupon number input error input 204 falls outside the allowable range, the server 102 creates error dialog display data required to display an error dialog 1300 shown in FIG. 13 and sends it to the user terminal 101, thus displaying that dialog. In this embodiment, whether or not the value falls within the allowable range is checked by comparing the value stored in the input error count 204 with a prescribed count (e.g., 10 times) specified in advance by the service server 102. This checking process may be done by setting a prescribed input error count in the coupon type-dependent information management table 300 of the coupon server 103, and specifying it for each coupon ID. Upon reception of a click input of a "return" button 1301 on the error dialog 1300, the order window display data, (second display data) which is created in advance and does not display any coupon number input field of the corresponding article, is read out, and is transmitted to the user terminal 101. In this way, the order window (second form) without any coupon number input field is displayed, thus inhibiting the user from inputting any coupon number.

If the record of the coupon ID is found in step S1004, the server 103 searches the coupon type-dependent information management table 300 for the service ID and site ID of a service site to acquire the record of the corresponding service.

The coupon server 103 checks in step S1008 if the input coupon number is a valid coupon number. This checking process is done based on the following conditions. The valid date 304 of the coupon is checked from the coupon type-dependent information management table 300, and if the valid date has expired, it is determined that the coupon number is invalid. The user ID 405 of the coupon ID information management table 400 is compared with the user ID sent from the service server 102. If the user ID 405 of the coupon ID information is −1 or the user ID 405 of the coupon ID information management table is equal to the user ID sent from the service server 102, the next checking process is done. Otherwise, it is determined that the user ID is invalid for that coupon ID. The coupon use count 403 is acquired from the coupon ID information management table, and is compared with the use limit count 305 of an identical coupon number in the coupon type-dependent information management table 300. If the coupon use count 403 is equal to or larger than the use limit count 304, it is determined that the coupon number is invalid. Next, the use amount 404 of the coupon ID information management table 400 is compared with the upper limit 308 of the discount amount of the coupon type-dependent information management table 300. If the use amount 404 is equal to or larger than the discount upper limit amount 308, it is determined that the coupon number is invalid.

If it is determined in step S1008 that the coupon number is invalid, the coupon server 103 returns an error code that advises the service server 102. A process to be executed at that time has already been described in step S1005.

If it is determined in step S1008 that the coupon ID is valid, the coupon server 103 notifies the service server 102 of it, and the flow advances to step S1009. In step S1009, the service server 102 resets the coupon number input error count 204 of the user information table 200 to "0", and the flow advances to step S1010. In step S1010, the server 102 creates user information input window display data required to display the user information input window 800, and transmits it to the user terminal 101, thus displaying the user information input window.

<Coupon Number Input Field Display Process>

Figure 11:
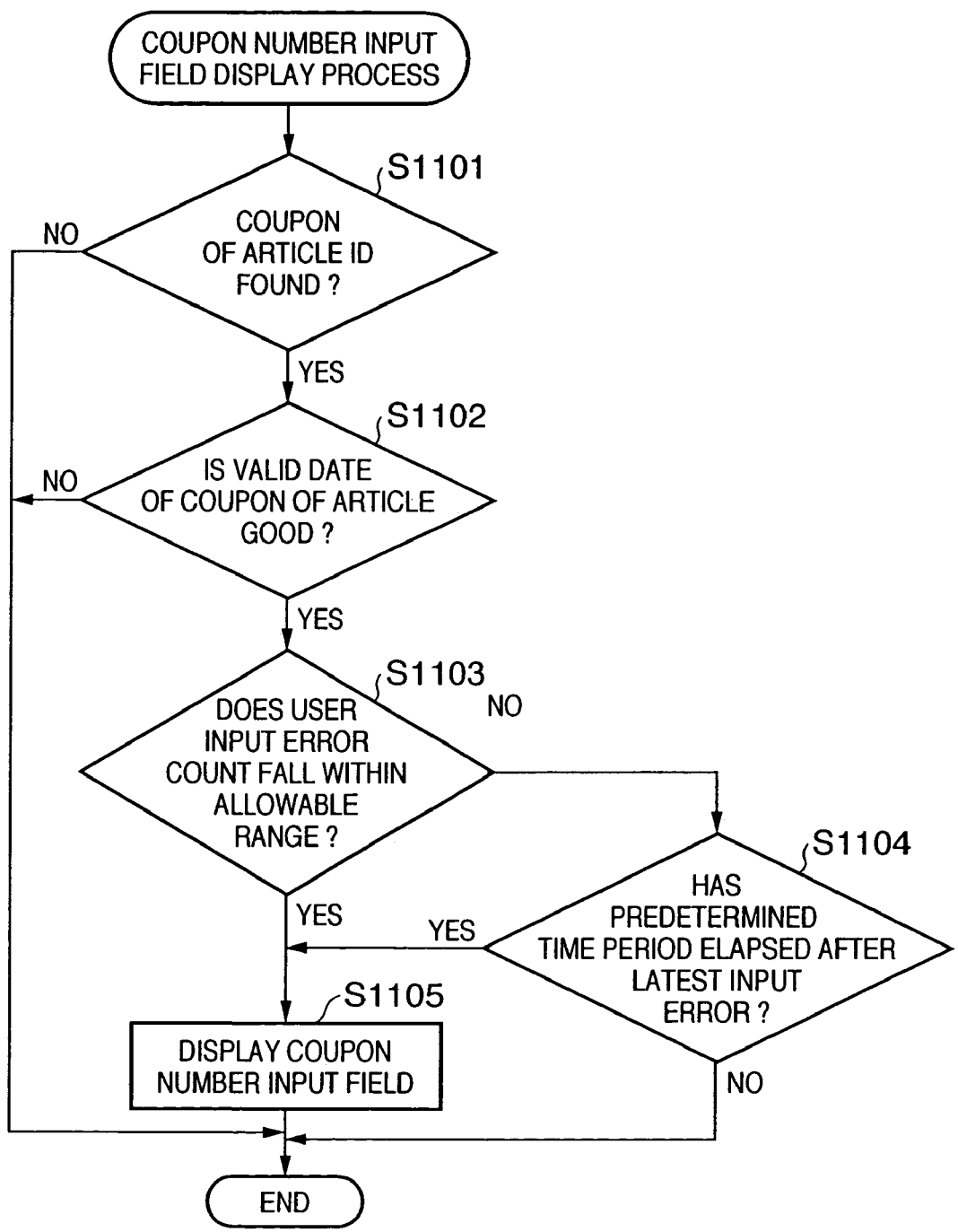
FIG. 11 is a flowchart showing a display process of a coupon number input field according to the embodiment of the present invention.

FIG. 11 is a flowchart showing the display processing sequence of the coupon number input field 705. A series of processes shown in FIG. 11 are done before step S1001 in FIG. 10. In this embodiment, whether or not the coupon number input field 705 is displayed is switched depending on conditions to be satisfied.

The service server 102 checks in step S1101 if a corresponding record is stored in the coupon type-dependent information management table 300 associated with the article ID of interest. This inquiry process can be done by passing the article ID (service ID) and the site ID Of the service server 102 from the service server 102 to the coupon server 103. The coupon server 103 searches the coupon type-dependent information management table 300 to check if a corresponding record is stored, and returns that result to the service server 102.

If no record is stored in the coupon type-dependent information management table 300, the server 102 reads out the order window display data held in advance from the memory, and sends it to the user terminal 101, thus ending the process. That is, since no process for embedding information required to display the coupon number input field in the order window display data is performed, the order window display data held in the memory is sent intact, and no coupon number input field 705 for the corresponding article is displayed on the order window 700. For example, various input fields of a scanner in FIG. 7 are displayed without any coupon number input field 705.

If a corresponding record is stored in the coupon type-dependent information management table 300, the service server 102 checks in step S1102 if the valid date of the coupon of the article ID is good. This inquiry process can also be done by passing the article ID (service ID) and the site ID of the service server 102 from the service server 102 to the coupon server 103. The coupon server 103 checks the valid date 304 of the coupon number from the record retrieved from the coupon type-dependent information management table 300, and returns to the service server 102 whether or not the current date is before the coupon's valid date.

If the valid date of the coupon number has expired, the server 102 reads out the order window display data cached from the memory, and sends it to the user terminal 101, thus ending the process. That is, no coupon number input field 705 for the article corresponding to the article ID is displayed on the order window 700.

If the valid date of the coupon number is good, the service server 102 checks in step S1103 if the value stored in the coupon number input error count 204 of the corresponding user falls within the allowable range. This process for checking if the value of the coupon number input error count 204 falls within the allowable range is the same as the check method executed upon displaying an error code in step S1006.

If the value of the coupon number input error count 204 of the user falls within the allowable range, the service server 102 creates the order window display data with a coupon number input field as the first display data by appending information required to display the coupon number input field 705 on the order window display data as the second display data held in the memory, and transmits it to the user terminal 101 in step S1105. As a result, the coupon number input field 705 for the article corresponding to the article ID is displayed on the order window 700.

If the value of the input error count 204 of the user falls outside the allowable range in step S1003, the service server acquires the latest input error time 205 of that user from the user information table 200, and checks in step S1104 if a prescribed time period (e.g., 10 min) has been expired from the current time.

In this embodiment, the latest input error time and input error count are managed for each user. Alternatively, the latest input error time for each coupon ID may be managed in the coupon ID information table 400 of the coupon server 103, and the input error count may be checked for each article and service.

If it is determined in step S1104 that the prescribed time period has elapsed, the service server 102 creates order window display data with a coupon number input field by appending information required to display the coupon number input field 705 to the order window display data held in memory, and transmits it to the user terminal 101, thus displaying the coupon number input field 705 for the corresponding article on the order window 700. At this time, the input error count 204 stored in the user information table 200 may be reset to "0".

If it is determined in step S1104 that the prescribed time period has not elapsed yet, the service server 102 reads out the order window display data cached in the memory, and transmits it to the user terminal 101, thus ending the process. That is, since no coupon number input field 705 for the corresponding article is displayed on the order window 700, input of the coupon number is inhibited.

In this manner, the process for checking if the prescribed time period has elapsed is done, and if the prescribed time period has not elapsed yet, the coupon number is inhibited from being input. With this arrangement, for example, the system can prevent any malicious user from acquiring a coupon number by automatically generating a large number of random numbers, and successively inputting them. The service server 102 can reduce an unwanted load upon reception of illicit coupon numbers.

Since the prescribed time period has elapsed, the coupon number input field 705 is re-displayed, and the user can input the coupon number again. That is, an authentic user who has manually repeated input errors without any malicious intention can make a re-input operation of the coupon number.

In this embodiment, whether or not the coupon number input field 705 is displayed is checked based on the time elapsed after the latest coupon number input error time of the user in step S1104. In place of the elapsed time, the latest coupon number input error time of the user may be compared with the login authentication time. That is, the latest login time 203 may be registered in the user information table 200 at the time of login authentication in step S501, and the latest login time 203 may be compared with the latest input error time 205 in step S1104. If the latest login time 203 is later than the latest input error time 205, window display data with a coupon number input field may be transmitted. In this case, even when the user has made a prescribed number or more of input errors of the coupon number, if he or she logs out and logs in again, the coupon number input field 705 is displayed again on the order window 700. Hence, the user can input the coupon number again.

In this way, when it is determined that the authentic user has manually repeated input errors, the system allows such user to re-input the coupon number. Hence, the user does not need to inquire the administrator, thus improving the system's usability. Consequently, the administrator is not required to answer any inquiries of users, greatly reducing his workload.

The system according to this embodiment allows the input of the coupon number under the condition that a login authentication has succeeded in step S501, and that the authenticated user ID is used in various subsequent processes. However, the present invention is not limited to this, and can be applied to a system which does not use login authentication as a condition. In this case, upon first reception of a coupon number from the user terminal 101, the session ID of a session of interest, the coupon number input error count and the latest input error time may be stored in a session management table, and the session ID may be used instead of the user ID in various processes.

In this embodiment, the coupon number input field 705 is displayed on the order window 700 of articles. However, when the user can use the perk independently of orders of articles, the coupon number input field may be displayed on the user information input window 800 or estimate window 900. When the coupon number input field is displayed on the estimate window 900, re-estimation may be made after the coupon number is input.

In this embodiment, if the value of the coupon number input error count 204 has exceeded the predetermined value in step S1103 in FIG. 11, the coupon number input field return condition is checked in step S1104. Alternatively, step S1104 may be executed before step S1103. If the coupon number input field return condition is met, the flow may advance to the process in step S1103 or S1105 after the input error count 204 stored in the user information table 200 is reset to "0". When time exceeds the input error count may be reset when either re-login from the user is accepted or when the login input delay exceeds a predetermine value set for unauthorized logins.

Note that various display data transmitted from the service server 102 to the user terminal are interpreted by a browser application installed in the user terminal 101, and are displayed on the window of the browser application. Also, various display data are described using a page script language such as HTML (Hyper Text Markup Language) that can be interpreted by a browser application.

Finally, the arrangement of a computer apparatus which forms the user terminal 101, the service server 102, and the coupon server 103 will be described below with reference to the block diagram of FIG. 14. Each of these apparatuses may be implemented by a single computer or by distributing respective functions to a plurality of computers as needed. When the apparatus is implemented by a plurality of computers, they are connected via, e.g., a Local Area Network (LAN) or the like to communicate with each other.

Figure 14:
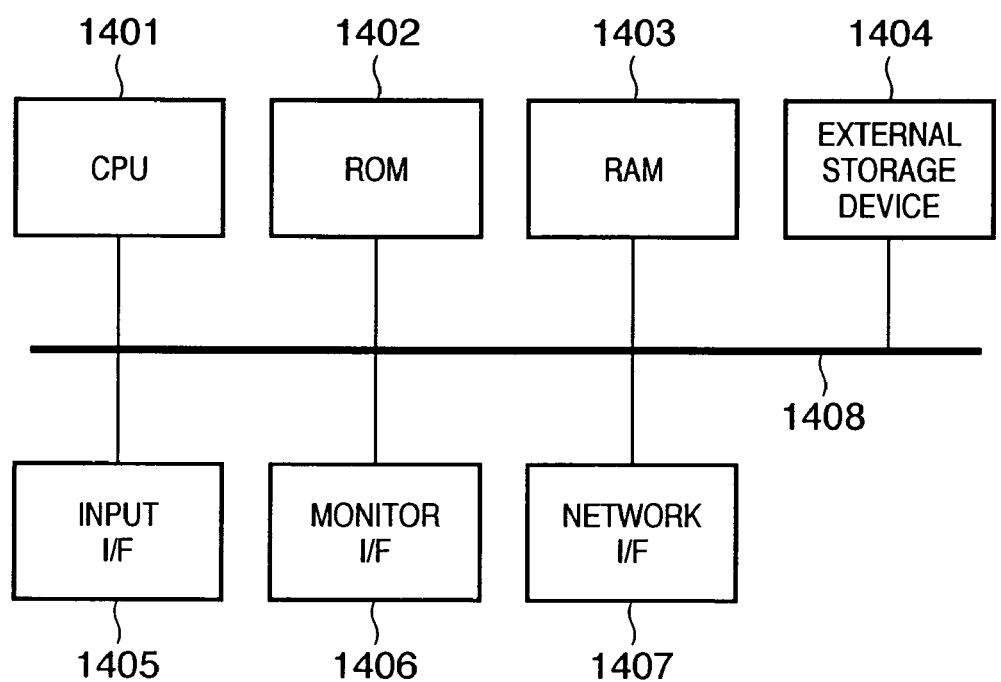
FIG. 14 is a block diagram showing the arrangement of a computer apparatus according to the embodiment of the present invention.

Referring to FIG. 14, reference numeral 1401 denotes a Central Processing Unit (CPU) which controls a computer 1400 as a whole. Reference numeral 1402 denotes a Read Only Memory (ROM) which stores programs and parameters which need not to be changed. Reference numeral 1403 denotes a Random Access Memory (RAM) which temporarily stores programs and data supplied to an external apparatus or the like. Reference numeral 1404 denotes an external storage device which could be a hard disk or a memory card that is fixed in the computer 1400 or a floppy disk (FD), or an optical disk such as a Compact Disk (CD) or the like, or a magnetic or optical card, or an IC card, or a memory card, and the like that are removable from the computer 1400. Reference numeral 1405 denotes an interface with input devices such as a pointing device, a keyboard, and the like, which receives user's operations and input data. Reference numeral 1406 denotes an interface with a monitor which displays data held and supplied by the computer 1400. Reference numeral 1407 denotes a network interface used to connect a network line for Internet or the like. Reference numeral 1408 denotes a system bus which connects the units 1401 to 1407 together and allows them to communicate.

Other Embodiments

The embodiments of the present invention have been described. The present invention may be applied to either a system made up of a plurality of devices, or an apparatus including a single device. A coupon number is used as an authentication code. However, the present invention is not limited to one specific code, and a character string, a combination of numerals and characters, and the like may be used as an authentication code.

Note that the present invention includes a case wherein the invention is achieved by directly or remotely supplying a software program that implements the functions of the aforementioned embodiments to a system or apparatus. In this case, software is not required to have the form of a program as long as it has the program function.

Therefore, the program code itself installed in a computer to implement the functional process of the present invention using the computer implements the present invention. That is, the present invention includes the computer program itself for implementing the functional process.

The form of programming is not particularly limited, and an object oriented language, an interpreted language, or even scripts supplied to an OS, may be used as along as they implement the program functions.

Any recording medium may be used for supplying the program, such as, a floppy disk, a hard disk, an optical disk, a magnetooptical disk, a MO, a CD ROM, a CD R, a CD RW, a magnetic tape, a nonvolatile memory card, a ROM, a DVD (DVD ROM, DVD R).

As another program supply method, it may be supplied by establishing a connection to a home page on the Internet using a browser on a client computer, and downloading the computer program itself of the present invention or a compressed file containing an automatic installation function from the home page onto a recording medium such as a hard disk or the like. Also, the program code that forms the program of the present invention may be segmented into a plurality of files, which may be downloaded from different home pages. That is, the claims of the present invention include a WWW server which allows a plurality of users to download program files required to implement the functional process of the present invention by the computer.

Also, a storage medium such as a CD ROM, which stores the encrypted program of the present invention, may be delivered to the user, the user who has cleared a predetermined condition may be allowed to download the key information that decrypts the program from a home page via the Internet, and the encrypted program may be executed using that key information.

The functions of the aforementioned embodiments may be implemented not only by executing the readout program code on the computer but also by some or all of actual processing operations being executed by an OS or the like running on the computer.

Furthermore, the functions of the aforementioned embodiments may be implemented by some or all of actual processes executed by a CPU or the like arranged in a function extension board or a function extension unit, which is inserted in or connected to the computer. Once the program is read out from the recording medium it is written in a memory of the extension board or unit to be executed later.

The present invention can be applied to all services that give the perk to each user by inputting numbers, symbols, and the like. According to the present invention, illicit accesses to an authentication system can be effectively suppressed without imposing any heavy load on the administrator.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-020378 filed on Jan. 28, 2004, which is hereby incorporated by reference herein.

What is claimed is:

1. A web server for providing a terminal used by a log-in authenticated user with a service via the Internet, comprising:
   a log-in authentication unit configured to transmit, to the terminal, log-in authentication dialog display data of a log-in screen for a user to input log-in authentication information, to receive log-in authentication information input by the user to the log-in screen, and to perform log-in authentication of the user based on the received log-in authentication information;
   an order screen transmission unit configured to transmit, to the terminal in a case where the user has been successfully authenticated by the log-in authentication unit, a first web page comprised of an order screen for the user to order an article, the first web page including an article identification input field for an article to be ordered and a coupon entry field through which coupon information related to the article to be ordered can be input;
   a receiving unit configured to receive article identification information of an article being ordered and coupon information associated to the article being ordered from the terminal, the article identification information and the coupon information being input by the user through the first web page;
   a first determination unit configured to determine, based on the received article identification information and the coupon information, whether or not the received coupon information is valid;
   a count unit configured to, in a case where the first determination unit determines that the coupon information is invalid, count a number of times that the first determination unit determines that the received coupon information is invalid;
   a second determination unit configured to determine, in a case where the number of times counted by the count unit exceeds a predetermined number, whether or not a predetermined time period has elapsed since the latest determination by the first determination unit that the coupon information is invalid; and
   an error dialog transmission unit configured to transmit to the terminal, in a first case where the number of times counted by the count unit does not exceed a predetermined number greater than 1, and in a second case where the number of times counted by the count unit exceeds the predetermined number and the second determination unit determines that the predetermined time period has elapsed, error dialog display data for displaying an error dialog requesting that the user confirm the error,
   wherein, when the user confirms the error through the displayed error dialog, the order screen transmission unit re-transmits the first web page to the terminal for the user to input again the article identification information and the coupon information,
   wherein, when the number counted by the count unit exceeds the predetermined number greater than 1, and the second determination unit determines that the predetermined time period has not elapsed, the order screen transmission unit transmits to the terminal, for replacing the first web page, a second web page comprised of an order screen that includes the article identification information input field but does not include the coupon entry field through which coupon information can be input, thereby inhibiting the user from being able to input the coupon information, and
   wherein, when a log-in authentication of the user is performed again by the log-in authentication unit after the user is inhibited from inputting the coupon information due to transmission of the second web page by the transmission unit, the order screen transmission unit re-transmits the first web page to again allow the user to input the coupon information.

2. The web server according to claim 1, wherein the first web page includes a plurality of article identification information and corresponding coupon entry fields through each of which coupon information for each of a plurality of articles can be input, and
   wherein the order screen transmission unit transmits the second web page which inhibits inputs of coupon information for each of the plurality of articles independently based on the number counted by the count unit that the received coupon information is invalid for each of the plurality of articles.

3. A method implemented in a web server for providing a terminal used by a log-in authenticated user with a service via the Internet, comprising:
   a log-in authentication step of transmitting, to the terminal, log-in authentication dialog display data of a log-in screen for a user to input log-in authentication information,
   receiving log-in authentication information input by the user to the log-in screen, and performing log-in authentication of the user based on the received log-in authentication information;
   an order screen transmission step of transmitting, to the terminal in a case where the user has been successfully authenticated in the log-in authentication step, a first web page comprised of an order screen for the user to order an article, the first web page including an article identification input field for an article to be ordered and a coupon entry field through which coupon information related to the article to be ordered can be input;
   a receiving step of receiving article identification information of an article being ordered and coupon information associated to the article being ordered from the terminal, the article identification information and the coupon information being input by the user through the first web page;
   a first determination step of determining, based on the received article identification information and the coupon information, whether or not the received coupon information is valid;
   a count step of, in a case where the first determination step determines that the coupon information is invalid, counting a number of times that the first determination step determines that the received coupon information is invalid;
   a second determination step of, in a case where the number of time counted by the count step exceeds a predetermined number, determining whether or not a predetermined time period has elapsed since the latest determination by the first determination step that the coupon information is invalid; and an error dialog transmission step of transmitting to the terminal, in a first case where the number of times counted by the count step does not exceed a predetermined number greater than 1, and in a second case where the number of times counted by the count step exceeds the predetermined number and the second determination step determines that the predetermined time period has elapsed, error dialog display data for displaying an error dialog requesting that the user confirm the error, wherein, when the user confirms the error through the displayed error dialog, the order screen transmission step re-transmits the first web page to the terminal for the user to input again the article identification information and the coupon information, wherein, when the number counted in the count step exceeds the predetermined number greater than 1, and the second determination step determines that the predetermined time period has not elapsed, the order screen transmission step transmits to the terminal, for replacing the first web page, a second web page comprised of an order screen that includes the article identification information input field but does not include the coupon entry field through which coupon information can be input, thereby inhibiting the user from being able to input the coupon information, and wherein, when a log-in authentication of the user is performed again by the log-in authentication step after the user is inhibited from inputting the coupon information due to transmission of the second web page by the order screen transmission step, the order screen transmission step re-transmits the first web page to again allow the user to input the coupon information.

4. A computer-readable storage medium on which is stored a computer program that implements a method for a web server for providing a terminal used by a log-in authenticated user with a service via the Internet, the method comprising:

a log-in authentication step of transmitting, to the terminal, log-in authentication dialog display data of a log-in screen for a user to input log-in authentication information, receiving log-in authentication information input by the user to the log-in screen, and performing log-in authentication of the user based on the received log-in authentication information;

an order screen transmission step of transmitting, to the terminal in a case where the user has been successfully authenticated by the log-in authentication step, a first web page comprised of an order screen for the user to order an article, the first web page including an article identification input field for an article to be ordered and a coupon entry field through which coupon information related to an article to be ordered can be input;

a receiving step of receiving article identification information of an article being ordered and coupon information associated to the article being ordered from the terminal, the article identification information and the coupon information being input by the user through the first web page;

a first determination step of determining, based on the received article identification information and the coupon information, whether or not the received coupon information is valid;

a count step of, in a case where the first determination step determines that the coupon information is invalid, counting a number of times that the first determination step determines that the received coupon information is invalid;

a second determination step of, in a case where the number of time counted by the count step exceeds a predetermined number, determining whether or not a predetermined time period has elapsed since the latest determination by the first determination step that the coupon information is invalid; and an error dialog transmission step of transmitting to the terminal, in a case where the number of times counted by the count step does not exceed a predetermined number greater than 1, and in a second case where the number of times counted by the count step exceeds the predetermined number and the second determination step determines that the predetermined time period has elapsed, error dialog display data for displaying an error dialog requesting that the user confirm the error, wherein, when the user confirms the error through the displayed error dialog, the order screen transmission step re-transmits the first web page to the terminal for the user to input again the article identification information and the coupon information, wherein, when the number counted in the count step exceeds the predetermined number greater than 1, and the second determination step determines that the predetermined time period has not elapsed, the order screen transmission step transmits to the terminal, for replacing the first web page, a second web page comprised of an order screen that includes the article identification information input field but does not include the coupon entry field through which coupon information can be input, thereby inhibiting the user from being able to input the coupon information, and wherein, when a log-in authentication of the user that is performed again by the log-in authentication step after the user is inhibited from inputting the coupon information due to transmission of the second web page by the order screen transmission step, the order screen transmission step re-transmits the first web page to again allow the user to input the coupon information.

* * * * *